Sept. 14, 1965          D. H. WILLIAMS          3,206,246
SEALING MEANS FOR CONVERTIBLE TOPS
Filed Aug. 3, 1962
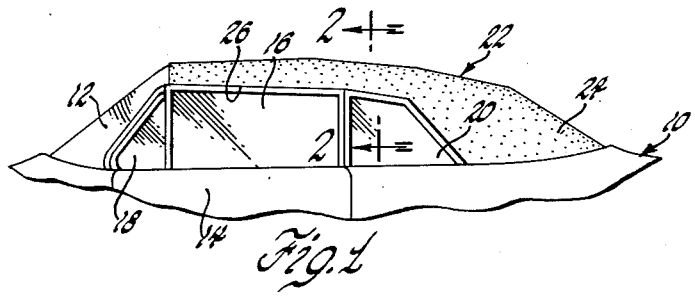
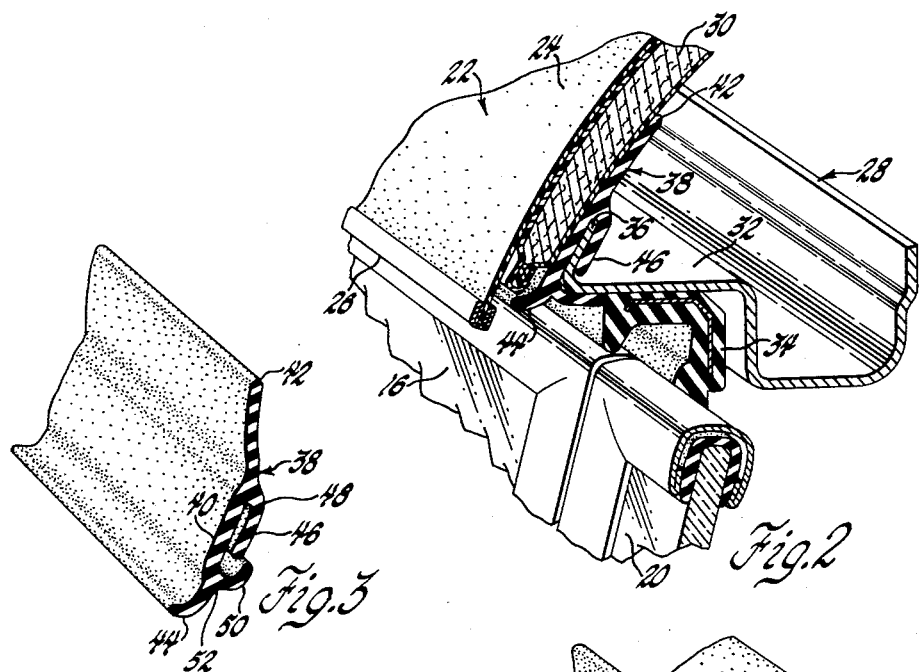
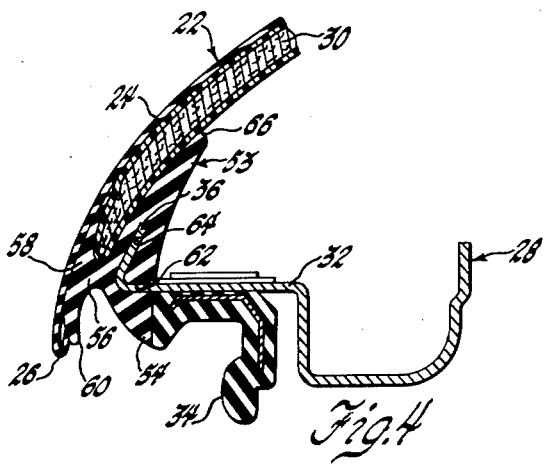
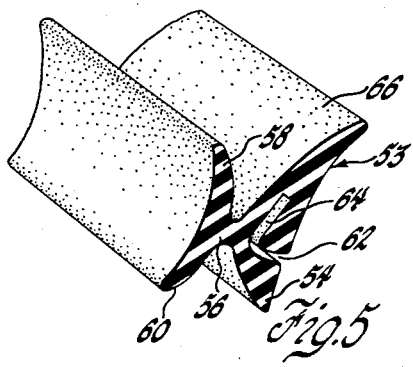
INVENTOR.
Dick H. Williams
BY
Herbert Furman
ATTORNEY United States Patent Office 3,206,246
Patented Sept. 14, 1965

3,206,246
SEALING MEANS FOR CONVERTIBLE TOPS
Dick H. Williams, Oak Park, Mich., assignor to General Motors Corporation, Detroit, Mich., a corporation of Delaware
Filed Aug. 3, 1962, Ser. No. 214,554
4 Claims. (Cl. 296—137)

This invention relates to convertible tops and more particularly to a sealing means for sealing convertible top fabric assemblies to convertible top frame side rails.

One feature of this invention is that it provides an improved sealing means for sealing convertible top fabric assemblies to convertible top frames. Another feature of this invention is that it provides an improved sealing means for sealing the edge portions of a convertible top fabric assembly to the respective convertible top side rails. A further feature of this invention is that it provides an improved sealing means for sealing a convertible top fabric assembly to a convertible top frame side rail and including a resilient member mounted on the side rail and having a plurality of deflectable lips engaging the fabric assembly adjacent the edge portion thereof.

These and other features and advantages of this invention will be readily apparent from the following specification and drawings wherein:

FIGURE 1 is a partial side elevational view of a convertible type vehicle body having a convertible top mounted thereon and embodying a sealing means according to this invention;

FIGURE 2 is an enlarged perspective sectional view taken generally along the plane indicated by line 2—2 of FIGURE 1;

FIGURE 3 is a view of a portion of FIGURE 2;

FIGURE 4 is a sectional view showing a modification of this invention, and

FIGURE 5 is a perspective view of a portion of FIGURE 4.

Referring now to FIGURE 1 of the drawings, a convertible type vehicle body 10 includes a windshield 12, a front door 14 which supports a vertically movable door window 16 and a swingable ventilation window 18 for closing the front door window opening, and a rear quarter window 20 mounted on the body in a conventional manner for closing the rear quarter window opening.

A conventional convertible top frame, such as used in current production vehicles, is mounted on the body 10 for movement between a raised position as shown and a lowered position not shown. Such top frames include a pair of foldable side rails, each of which includes a plurality of pivotally interconnected rail sections, with the side rails being interconnected by one or more top bows which support a conventional convertible top fabric assembly 22.

As shown in FIGURE 2, the fabric assembly 22 includes an outer cover 24, the side edge portions 26 of which terminate outwardly of and adjacent the roof rails 28 of the body. The edge portions of the cover 24 are secured to the top bows in a conventional manner by means of longitudinally extending "blankets" or pads 30 which are secured to the cover 24 adjacent the edge portions 26 thereof and in turn are secured to the top bows. Structure such as this is conventional and has been used on production automobiles for many years.

The side rail 28 of the top frame includes an outer laterally extending leg or flange 32 which mounts a conventional weatherstrip 34 for sealing the upper edge portions of the window 16 and 20, with flange 32 terminating in an upwardly and inwardly extending terminal leg or flange 36. A weatherstrip or sealing member 38 is mounted on the leg 36 and seals against the blankets or pads 30 in the raised position on the top in order to provide a seal against the entry of ambient air and material and also against the exit of ambient air from within the body. Present day production automobiles do not include such a seal and accordingly it is possible for ambient air and other foreign material to enter the body between the blankets 30 and the rails 28, and it is also possible for the air from within the body to escape across the rails 28 and past the blankets 30. The escape of air is ordinarily not important except in air conditioned vehicles wherein it is important and desirable to prevent escape of the cooled air circulating within the body.

As shown in FIGURE 3, the sealing member 38 includes a body 40 provided with oppositely extending arcuately-shaped deflectable sealing lips 42 and 44. Body 40 further includes a return bent arcuate lip or leg 46 which is joined to the body 40 by a juncture area 48 which also joins the lip 42 to the body. Another return bent arcuate lip or leg 50 extends from the body 40 adjacent the juncture area 52 of the body with the lip 44. When the sealing member 38 is mounted on the roof rail 28, as shown in FIGURE 2, the leg 36 of the rail is received within the pocket between the body 40 and the leg 46 of the sealing member, with the leg 50 of the sealing member being deflected into sealing engagement with the leg 32 of the rail and engaging the weatherstrip 34. The lip 42 is deflected inwardly of the body so as to conform to the shape of the inner surface of the blanket 30 and form a continuation of the body 40 so that both the body 40 and the lip 42 are in surface-to-surface engagement with the inner surface of the blanket 30 to form a seal. The lip 44 wraps around the lower edge portion of the blanket 30 and engages the inner surface of the cover 24 adjacent the edge portion 26 thereof to provide an additional seal between the fabric assembly 22 and the rail 28. It is important that the fabric assembly 22 be sealed to the rail 28 both immediately opposite to and above the leg 36 to effect an adequate seal.

FIGURES 4 and 5 show a modification of this invention and like numerals have been used for like parts. The modified sealing member 53 is generally of X shape cross section and includes a body portion 54 which is joined by a narrow rib portion 56 to a pair of oppositely extending generally arcuately-shaped upper and lower sealing lips 58 and 60, respectively, which are generally of airfoil cross section. The body portion 54 includes a continuous longitudinally extending slot or groove 62 which opens to another longitudinally extending closed slot or groove 64 extending generally laterally to the groove 62. The groove 64 is provided within a sealing lip 66 of the member 52.

When the sealing member 53 is mounted on the roof rail 28, as shown in FIGURE 4, the leg 36 of the rail 28 is received within the slot or groove 64 and the flange or leg 32 of the rail fits within the groove 62, with the juncture area between the grooves 62 and 64 receiving the juncture rib or area between the legs 32 and 36. The lower edge portion of the blanket 30 is received between the sealing lips 58 and 66, with the adjacent surfaces of these sealing lips 58 and 66 engaging the respective outer and inner surfaces of the blanket 30. The lip 58 is deflected inwardly of the body in order to be received between and engage the blanket 30 and the cover 24 and the lip 66 may also be deflected slightly inwardly of the body so that both lips engage in surface-to-surface relationship with the blanket 30. The lip 60 is also deflected inwardly of the body to provide a continuation of the lip 58 and ensure that both lips 58 and 60 fit in surface-to-surface engagement with the inner surface of the cover 24 adjacent the lower edge portion 26 thereof. It will further be noted that body 54 bears against the weatherstrip 34 to provide an additional seal against the entry and exit of aid and other material between the leg 32 and the weatherstrip 34.

It will be noted that in both forms of the invention, the sealing member is substantially concealed from view from both within the body and from the exterior thereof and that both members seal a substantial area of the blanket 30 or of the blanket 30 and the cover 24. It is intended, of course, that the sealing members be provided along the entire lower edge portion of each side of the assembly 22.

When the top frame is lowered, the top fabric folds relative to the side rail 28 and the blankets 30 will move out of engagement with the sealing members to thereby break the seal. Both forms of the invention are effective only when the top is in a raised position.

Thus, this invention provides a new and improved sealing means for sealing convertible top fabrics to convertible top frame side rails.

What is claimed is:

1. The combination comprising a vehicle body, a convertible top mounted on said body and including a top frame having a side rail and a top fabric assembly including a fabric cover and an attaching pad supported on said top frame, and a resilient sealing member mounted on said rail, said member including an upwardly extending flexible sealing lip engaging said pad adjacent the lower edge portion thereof and a generally downwardly extending flexible sealing lip engaging said fabric cover adjacent the lower edge portion thereof and below said pad.

2. The combination comprising a vehicle body, a convertible top mounted on said body and including a top frame having a side rail and a top fabric assembly including a fabric cover and an attaching pad supported on said top frame, and a resilient sealing member mounted on said rail, said member including a spaced pair of upwardly extending flexible sealing lips receiving the lower edge portion of said pad therebetween and a generally downwardly extending sealing lip engaging said fabric cover adjacent the lower edge portion thereof below said pad and terminating above an adjacent terminal edge of said fabric cover so as to be concealed from view.

3. The combination comprising a vehicle body, a convertible top mounted on said body and including a top frame having a side rail and a top fabric assembly having a fabric cover and an attaching pad supported on said top frame, said side rail including a flange extending generally laterally thereto and in spaced juxtaposed relation to a lower edge portion of said pad, a resilient sealing member including a body portion having a pocket therein for receiving said side rail flange to mount said sealing member thereon, a first lip extending upwardly from said body portion and sealingly engaging said pad adjacent the lower edge portion thereof, and a second lip extending from said body portion below the lower edge portion of said pad and sealingly engaging said fabric cover.

4. The combination comprising a vehicle body, a convertible top mounted on said body and including a top frame having a side rail and a top fabric assembly having a fabric cover and an attaching pad supported on said top frame, said side rail including a flange extending generally laterally thereto and in spaced juxtaposed relation to a lower edge portion of said pad, a resilient sealing member including a body portion provided by a pair of spaced interconnected lips defining a pocket for receiving said said rail flange to mount said sealing member thereon, a first extended lip extending from one of said body portion lips as a continuation thereof, said one body portion lip and said first extended lip sealingly engaging said attaching pad adjacent the lower edge portion thereof, and a second extended lip extending below the lower edge portion of said pad and sealingly engaging said fabric cover.

References Cited by the Examiner

UNITED STATES PATENTS

| 1,706,597 | 3/29 | Anderson | 20—69 |
| 2,737,412 | 5/56 | Smith et al. | 20—69 |

FOREIGN PATENTS

| 644,969 | 10/50 | Great Britain. |

A. HARRY LEVY, *Primary Examiner.*

PHILIP ARNOLD, *Examiner.*